United States Patent [19]

Sansone et al.

[11] Patent Number: 4,837,701

[45] Date of Patent: Jun. 6, 1989

[54] MAIL PROCESSING SYSTEM WITH MULTIPLE WORK STATIONS

[75] Inventors: Ronald P. Sansone, Weston; George G. Gelfer, W. Redding; Michael P. Taylor, Norwalk; Barry H. Axelrod, Newtown, all of Conn.

[73] Assignee: Pitney Bowes Inc., Stamford, Conn.

[21] Appl. No.: 904,577

[22] Filed: Sep. 5, 1986

Related U.S. Application Data

[63] Continuation-in-part of Ser. No. 813,445, Dec. 26, 1985.

[51] Int. Cl.[4] .............................................. G06F 15/20

[52] U.S. Cl. ................................ 364/464.03; 364/466

[58] Field of Search ........... 364/464, 466, 900, 464.02, 364/464.03

[56] References Cited

U.S. PATENT DOCUMENTS

| | | | |
|---|---|---|---|
| 710,997 | 10/1902 | Pitney | 101/79 |
| 3,792,446 | 2/1974 | McFiggins et al. | 364/900 |
| 3,832,946 | 9/1974 | Lupkas | 101/93.08 |
| 3,869,986 | 3/1975 | Hubbard | 101/91 |
| 4,097,923 | 6/1978 | Eckert | 364/900 |
| 4,122,532 | 10/1978 | Dlugos | 364/900 |
| 4,168,533 | 9/1979 | Schwartz | 364/900 |
| 4,319,328 | 3/1982 | Eggert | 364/466 |
| 4,511,793 | 4/1985 | Racanelli | 364/466 X |
| 4,639,873 | 1/1987 | Baggarly et al. | 364/478 X |
| 4,752,950 | 6/1988 | Le Carpentier | 364/464.02 X |
| 4,760,532 | 7/1988 | Sansone et al. | 364/464.03 |

*Primary Examiner*—Parshotam S. Lall
*Assistant Examiner*—Edward R. Cosimano
*Attorney, Agent, or Firm*—Peter Vrahotes; Melvin J. Scolnick; David E. Pitchenik

[57] ABSTRACT

A system for processing batch mail in which the need for on-site inspection is unnecessary. The mail sender purchases postage from a central station thereby authorizing him to send mail equal to the amount of postage purchased. The mail sender processes batches utilizing a plurality of work stations. Each batch is accompanied by a statement summarizing the type and number of mail pieces sent and amount of postage for each batch. The statement contains data that allows mail payment verification.

20 Claims, 12 Drawing Sheets

MAIL PROCESSING SYSTEM WITH MULTIPLE WORK STATIONS

RELATED CASES

This is a continuation-in-part application of co-pending application having Ser. No. 813,445 filed Dec. 26, 1985. Subject matter similar to the subject matter contained in the instant application may be found in U.S. patent application entitled "Postage and Mailing Information Applying System" by Ronald Sansone and et al, filed Aug. 6, 1985, having Ser. No. 762,994 and assigned to the assignee of the instant application, now U.S. Pat. No. 4,725,718.

BACKGROUND OF THE INVENTION

Certain organizations dispatch large amounts of mail on a periodic basis. Examples of such organizations are: banking institution, utility companies, insurance companies, credit companies, and the like. With such large quantities, these mail senders normally pre-package and pre-sort their mail and are given a lower postage rate by the postal service because of the time saved by the postal service. There are generally two ways in which such mail senders apply postage to their mail. The most common way is by use of a postage meter which is leased by the mail sender from a postage meter manufacturer with which the amount of postage required is applied to each mail piece. Inserter systems have been developed whereby inserts may be placed into an envelope and the envelope may be sealed, addressed and have a postage indicia applied thereto. The mail pieces may be weighed on the fly or individual weighing may not be required if all the mail pieces are of like kind, i.e., only a sample mail piece need be weighed. These acts of processing mail may be performed at a relatively high rate of speed.

A second method of mailing large quantities of mail pieces is the permit mail system. In such a system, the mail sender places a permit number on the mail pieces and prepares a manifest listing that shows the type and number of mail pieces being mailed on each occasion and the postage required.

With both such systems, inspection at the site of the mail sender is required. In the case of the postage meter, the lessor of the postage meter, i.e., the postage meter manufacturer, is required by law to inspect the postage meter at least twice a year to ensure that there is no evidence of tampering with the postage meter that will indicate an attempt to obtain unauthorized postage. In the case of permit mail, large quantities of the same type of mail will be mailed at one time and the postal service will conduct an inspection to verify that the manifest listing accompanying the permit mail accurately accounts for the amount of postage due. This is acccomplished through an inspection on the part the postal service by examining the records of the mail sender on every occasion.

Obviously, each of these two systems has certain drawbacks. In the case of on-site inspection of postage meters, with the large number of postage meters in use by large mail senders it is an expensive matter for the inspection thereof. Furthermore, postage meters that process large quantities of mail must be replaced relatively frequently because of wear. With regard to the permit mail system, the shortcoming lies in the need of the postal service to send a representative frequently to the various mail sender locations to ensure that the mail sender is accurately accounting for the quantity of mail being sent. Such a scheme is not totally reliable as it relies upon on-site verification using the mail senders records which are not secure.

SUMMARY AND OBJECTS OF THE INVENTION

A system has been conceived whereby a mail sender will be able to send large quantities or batches of mail without the need on on-site inspections. This is accomplished by the mail sender having a secure accounting unit, similar to a postage meter in which posatage value is charged by a dispensing or central station. A statement accompanies each batch of mail which statement contains information relative to the mail and the amount of postage required. Communication between the central station and the mail sender allows postage value to be transferred to the user by the central station and mailing and verification data to be sent to the central station from the mail sender. The mailing and verification data will be the same as that contained on the mailing statements that accompany the batches of mail. This system provides a central station for a large number of mail senders whereby the postal serice is relieved of its obligation of having on-site inspections and the central station acts as a clearing house for the postal service through whom verification of postage can be conveniently and inexpensively achieved.

Another feature of the instant invnetion is that each user can have a plurality of work stations with only one secure accounting unit accounting for the batches of mail processed by all the work stations.

Still another feature of this invention is that a user may have a plurality of locations including, for example, electronic postage meters locations remote from one another and be service by a single central station.

A further feature of this invention is that the security features of a postage meter are provided while allowing a high speed, relatively inexpensive printer to be used for printing the mail pieces.

BRIEF DESCRIPTION OF THE DRAWING

In the figures of the drawing, like reference numbers are used to designate similar elements.

DETAILED DESCRIPTION OF THE PREFERRED EMBODIMENT

Figure 1:
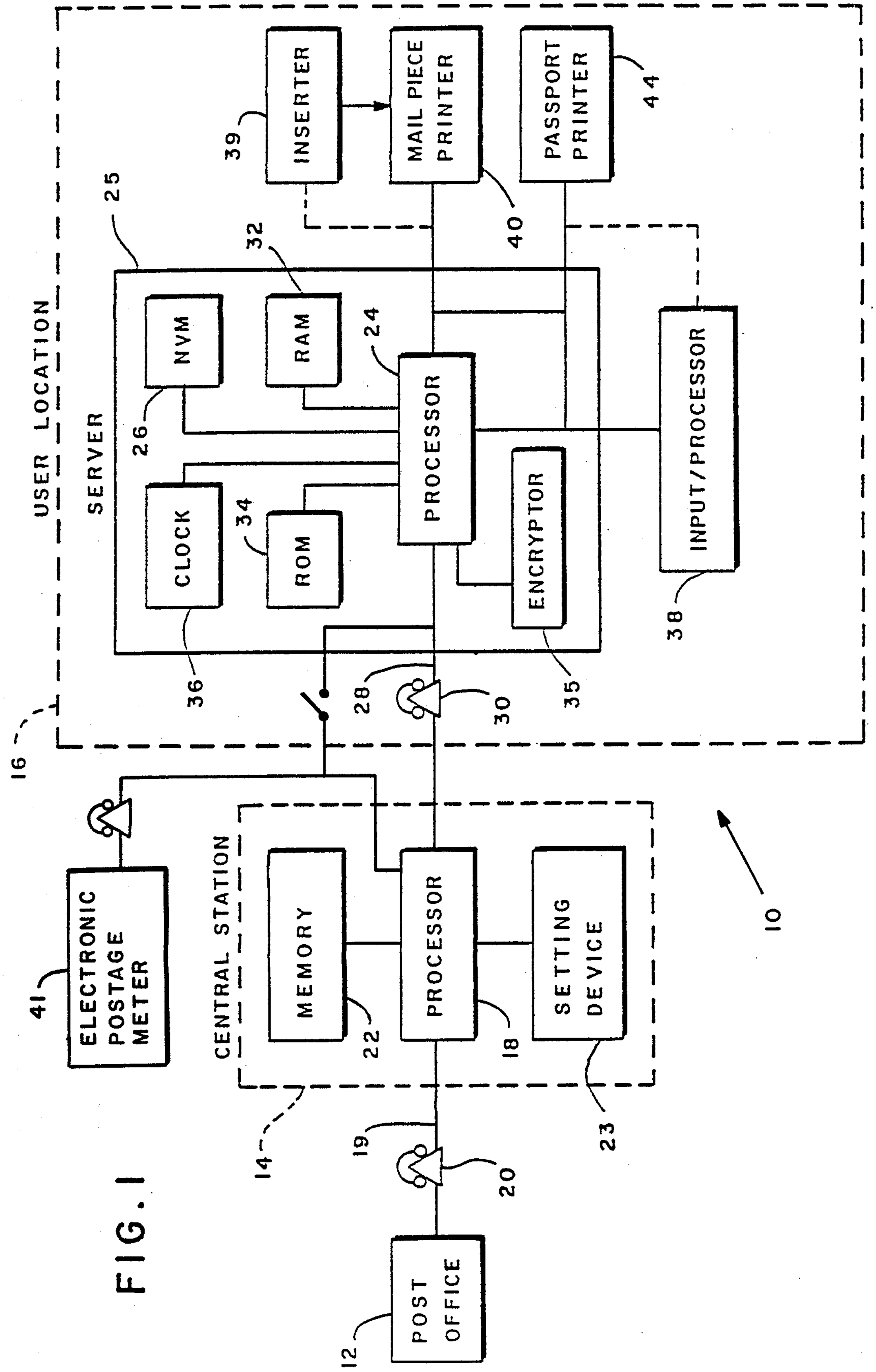
FIG. 1 is a block diagram of a batch mailing system with a single work station.

Referring now to FIG. 1, a batch mailing system is shown generally at 10 and includes a post office 12, a central station 14 and a user location 16. The central station 14 has a processor 18. This processor 18 could be a main frame type of computer having substantial capacity. Communication is provided between the post office 12 and a plurality of central stations 14 (only being shown) through a line or communication link 19 having a communication device such as a telephone 20 therein. Associated with the processor 18 and in connection therewith is a large storage memory unit 22 where large amounts of data can be stored and a register setting device 23 which includes encryption software of the type required in the resetting of postage meters remotely. Systems for resetting of meters remotely are well known, see for example U.S. Pat. Nos. 3,792,446, 4,097,923 and 4,447,890.

A remote user location 16 has a secure unit 25 which will hereafter be referred to as a "server". The server 25 is supplied by the central station 14 to the user and includes a user processor 24 which may be a processor of somewhat smaller capacity. Connected to the processor 24 is a memory 26. Preferably the memory 26 will be a non-volatile memory (NVM). The user processor 24 is connected to the central station processor 18 through a communication link or line 28. A telephone 30 or other communicating device may be disposed within the line 28 to thereby provide selective communication between the processors 18, 24. Also connected to the processor 24 are a RAM 32, a ROM 34, an encryptor 35 and a clock 36 whose respective functions will be described in detail hereinafter. An input/processor 38 is connected to the user processor 24 whereby data may be supplied, either manually or through a medium such as a disc or tape, to the user processor 24 for the purpose of providing data required in the processing of mail pieces. The input/processor 38 may be any of a large number of personal computers having keyboard and display which are commercially available, such as an IBM AT personal computer.

A high speed inserter 39 is in electrical communication with the server 25 and performs the physical acts involved in processing the mail such as the inserting of inserts into envelops, sealing the envelope flaps, orienting the mail pieces and conveying the mail pieces to a postage meter or printer. The term "insert" includes bills, advertising materials, notices, etc., which are of a size to be received within an envelope or the like. High speed inserters of this type are readily available commercially, as for example Inserter model No. 3100 series from Pitney Bowes Inc., Stamford, Ct.

A first printer 40 is in communication with the user processor 24 of the server 25 and with the input/processor 38 and is able to print upon mail pieces 42 such as envelopes containing inserts which it receives from the inserter 39. This printer 40 is one provided by the user and will be an unsecured, high speed printer which may be controlled either through the processor 24 or through the input/processor 38. A second printer 44 is provided to print upon a statement sheet 46 or other document. This second printer 44 is preferably a secure printer that is provided by the central station 14. By secured is meant a device constructed in the same manner as a postage meter without access to the interiors thereof except by authorized personnel. An example of such a postage meter is a Model 6500 postage meter available from Pitney Bowes Inc., supra. Obviously, the second printer can be an unsecured printer but this occasions greater risk in terms of verifying payment of mail. Throughout the balance of the specification and claims this statement sheet 46 will be referred to as a "passport". Details of the passport 46 (FIG. 6) will be described hereinafter in conjunction with FIG. 2.

In operation, the user at the user location 16 will be a sender of large quantities of mail who will be given an identification number by the central station 14 that will be placed in the NVM 26 of the server 25. This identification number will be permanent and unique for each server 25 and the user will have no access to that portion of the NVM 26 that stores the identification number. It will be appreciated that this feature may be applied to postage meters as well. Having the identification number in memory 26 eliminates the need of having a plate applied to a postage meter of a server 25. It will be appreciated that a server has many characteristics of a postage meter, i.e., security, a descending register and the like, but certain elements are absent. The most evident absent element is a printer, the advantage of which is described thoughout. Another absent member is an ascending register. In a postage meter an ascending register is ascessable only by a service representative of the meter manufacturer and may be used to determine if any meter tampering has take place. As will be appreciated from the description that follows, the need for an ascending register in the server 25 is obviated. Following installation of the identification number, the user will communicate with the central station 14 through the telephone 30 for the purpose of indicating to the central station 14 the amount of postage value it wishes to have accredited to its memory 26. An access code will be given to the user that can be addressed to the setting device 23 through the touch dial of the telephone 30. Upon the receipt of the access code, the user will transmit to the central station 14 the access code and his identification number and the request for an amount of postage value. The setting device 23 will function to charge, or increase, the postage value into the memory 26. This memory 26 will include a descending register which is charged by the central station 14 with the selected amount of postage value. As the user location 16 processes mail, the postage value in the descending register will be decreased in accordance with the postage required to process the mail pieces 42. Devices for charging registers such as the descending registers are well known, as for example see U.S. Pat. Nos. 3,792,446, 4,097,923 and 4,447,890.

A conventional electronic postage meter 41 such as for example, the 6500 series postage meter of Pitney Bowes having a remote resetting capability is shown in FIG. 1 in selective communication with the processor 24 of server 25. This communication may be by telephone link similar to that described for communication with the central station 14 so that funds may be transferred from the serve 25 to the electronic postage meters 42. It will be appreciated that the communication may be by way of a modem or other serial or parallel data transmission schemes well known in the art. In the preferred embodiment illustrated, the postage meter 41 is also operative to communicate directly with the central station 14 over a telephone line as is conventional and described, for example, in U.S. 4,097,923, specifically incorporated by reference herein.

The balance of the server 25 includes the ROM 34 that contains information which formats address signals and stores a series of programs for controlling the functions of the server 25, a RAM 32 that will hold and supply real time data, a clock 36 that will provide the time and date and an encryptor 35 that will store the code required for the descending register setting functions. The encryptor 35 can be any one of a number of encrypting devices including devices which use the Data Encryption Standards described in FIPS P4B 46, dated Jan. 15, 1977 and published by the U.S. Department of Commerce, National Bureau of Standards.

It will be appreciated that the printer 40 is a high speed, inexpensive, unsecured printer such as a ink jet printer or laser printer or any type of dot matrix printer which will apply the addresses of the addressee and addressor to the face of the mail pieces under command of the input/processor 38. In addition, other information can be printed by the printer 40 upon each mail piece 42 when under command of the processor 24. This information includes a transaction number (T.A. No.), the run of the particular batch of mail, the date and time of mailing, the class of mail and a batch number. The transaction number is that number assigned to the user station by the central station 14 every time postage value is added to the server 25 and will be stored in the NVM 26. This transaction number will be the same for one or more batches of mail that are sent and will remain the same until such time as the descending register of the NVM 26 is recharged with postage value, at which time a new transaction number will be assigned and stored in the NVM in place of the preceding transaction number. By changing the transaction number upon each recharge, an element is provided for verifying postage. The batch number is one assigned by the user through the input/processor 38 whereby a given batch of mail, i.e., mail of a particular type or character, will be identified by a number assigned by the user. In addition, a run number, which is a subset of the batch, may be given to identified particular segments of the batch.

When a batch of mail is to be sent, the user will supply mailing and verification information through the input/processor 38 into the user processor 24 which will transmit at least a portion of this information to the inserter 39. This information would include the number of mail pieces to be processed and number of inserts to be placed in each envelope. The time and date may be supplied to the printer 40 through the input/processor 38 by overriding the clock 36. This overriding is useful when future mail is being processed. The user processor 24 will then command the printer 40 to print the appropriate postage, time, date, transaction number and address on the mail pieces 42 for a particular run. This run will be given a number that is associated with the particular mail to be sent, which number will be printed on the envelopes 42 of that run. As the printer prints the appropriate information upon each mail piece, the number of mail pieces and amount of postage required will be determined by the processor 24. At the end of the run or batch, the second printer 44 will print authorization information upon a passport 46.

Figure 6:
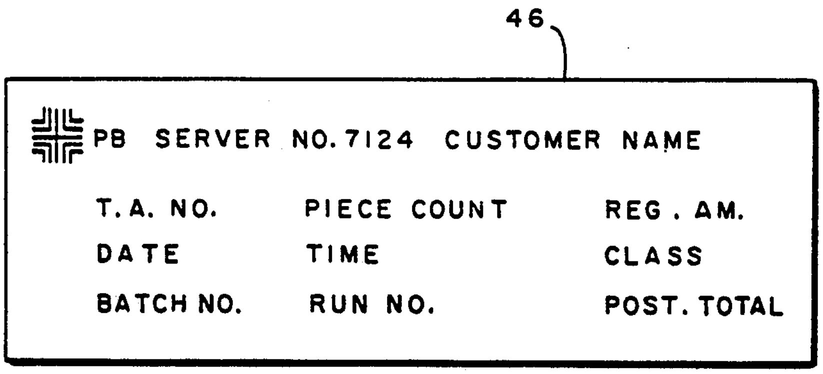
FIG. 6 is a plan view of an accounting statement that would accompany batch mail sent by the system of FIG. 1.

Referring now to FIG. 6, the passport 46 is shown after having printed thereon the total postage (Post. Total) required to mail the batch of mail, the transaction number (T.A. No.), piece count for a batch, descending register amount (Reg. Am.) after subtraction for the postage, the date, the time, the class, the batch number and the run number (optionally). Additionally, the server number, i.e., the identification number stored in the NVM 26, user name and any desired graphics can be printed. This information on the passport 46 serves many purposes. Firstly, the register amount acts as a physical record of the postage value stored in the descending register of the NVM 26. This amount is printed on the passport 46 on the upper right hand. The register amount will be that amount in the descending register after all postal charges have been made for the batch of mail to be sent. By placing this register amount on the passport 46 after the mailing of each batch, an ongoing, permanent record is maintained of the amount of postage value contained within the NVM 26. In this way, if there is a disaster wherein the server 25 is destroyed or the memory 26 therein is inadvertently erased, the user will still have a means for verifying the amount of postage value remaining from that amount of postage value originally purchased and stored. The transaction number provides an authorization check as does the identification or server number. By changing the transaction number with each recharge of the server, one can readily determine if more postage accompanies a transaction number than is authorized. Also printed on the passport 46 will be the date and time the passport 46 is printed, the piece count, i.e., the number of mail pieces mailed in the particular batch, and the class of mail. Upon the printing of the information on the passport 46, the postage amount for the batch will be subtracted from postage value stored in the descending register of the NVM 26.

The information printed upon the passport 46 is transmitted to the central station 14 through the communication line 28 automatically after each batch, is processed so that a record is maintained through the processor 18 that communicates with memory 22. The memory 22 has an ascending register therein that corresponds to the descending register in the server 25, i.e., one is the inverse of the other. As is known, an ascending register is one that accumulates charges over a long term. Optionally, the memory 22 may have a descending register that duplicates the amounts in the descending register in the NVM on an ongoing basis. By having the postage value contained within the memory 22 that corresponds to the value of the server 16, a check is constantly made to ensure that there is a correspondence between the passport 46 information and the amount of postage paid by the user. More specifically, the total amount credited to the user station will be stored in memory 22 and if the amount in the ascending register exceeds that total amount available to the user, the user location 16 will be notified that there are insufficient funds. When a batch of mail is sent to a post office for processing, the passport 46 for that particular batch will accompany the mail. The postal employee can determine whether it is an authorized transmission of mail from the information contained upon the accompanying passport 46. If there is any question on the part of the postal service as to whether the information is authentic, it will contact the central station 14 through the line 19 and obtain the information from the central station 14 to verify the information contained on the passport 46. If this information is accurate, then the postal service will known that the mail is authorized, i.e., the postage for the mail has been paid. On the other hand, if there is any discrepancy, the postal service is able to act to ferret any fraud or corect any discrepancy. As is the usual practice in the user of postage meters, a user location 16 will send all its mail to an assigned post office.

Figure 7:
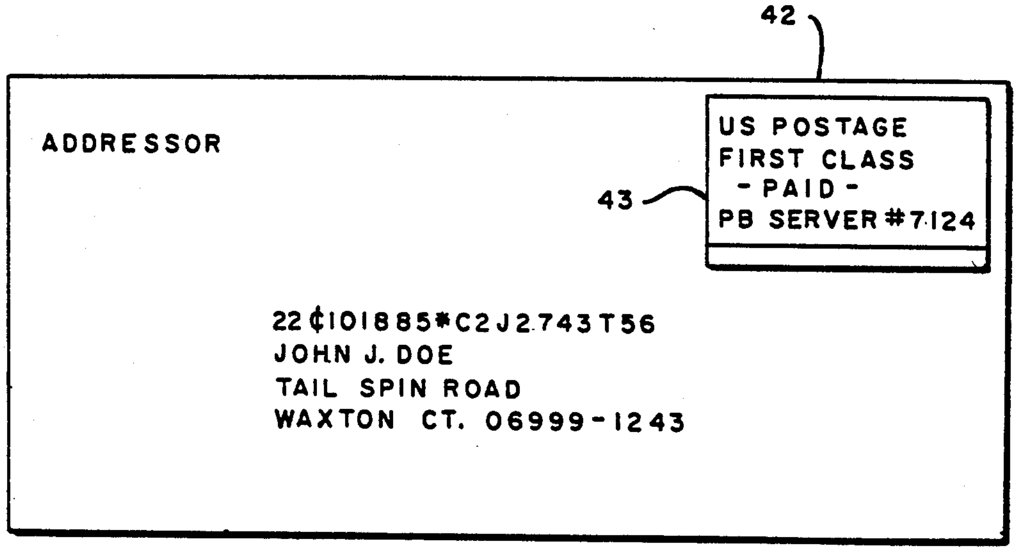
FIG. 7 is a plan view of an envelope containing information that would be applied thereto by the system of FIG. 1.

Referring now to FIG. 7, an envelope 42 is shown as it would be prepared by the present system 10. The upper left hand corner contains the address of the mail sender and the upper right hand corner contains a pre-print block 43 containing the class of mail and gives the identification number or server number of the mail sender. This information may be preprinted on the envelopes 42 piror to processing of a batch. Such preprinting may be accomplished through direct communication of the input/processor 38 with the printer 44 without any participation of the other components of the user location 16.

In the processing of batch mail, the three address lines will first be printed in the address field with the name of the recipient, the street address and the city, state, zip code. The fourth line, or postage line is then printed using information supplied by the processor. This postage line, includes the postage amount $.22, the date, Oct. 18, 1985 and the transaction number, which in this case is C2J2743T56. Other information may be given on this postage line is so desired including the time the mail is processed. Although the postage line is shown in alpha-numerics it will be appreciated that the same may be printed in bar code and, optionally, bar code address information may be printed on the envelope as desired. Additionally, the information in the pre-print block 43 may be printed in the address field with the other information therein and the pre-print block may be eliminated.

Although an envelope 42 shown has the postage and address information printed on the face thereof the same scheme will apply to a windowed envelope. In a windowed envelope it may be preprinted as previously described but instead of the printer 40 printing on the face of the envelope 42, an insert would be printed with the same information shown on the face of the envelope 42 and inserted so as to be viewed from the window. Alternatively, the postage and address information may be printed upon a label and the label may be attached to the envelope 42.

In this way what is provided is a method of allowing a organization to send large amounts of mail without having to frank every piece. In addition, the postal service is saved the problem of requiring on-site inspections at the user location 16 in order to verify that no unauthorized mail is being sent. By correlating the amount of postage, the transaction number, piece count, registration amount and the like, verificatin can be made without the need of encryption. The central station 14 more or less acts as a bank representing the postal serive and handles the funds on its behalf as well as maintains records for verification. The funds or postage value charged to the server 25 may be either pre-paid or charged to the user by the central station 14 on a credit arrangement. The central station 14 would be accountable to the postal service for the postage value placed in the server on a immediate basis. The central station may be a postage meter or server 25 manufacturer or any other reliable entity.

Another advantage of this system is that the printer 40 that prints the large numbers of mail pieces is not part of a secure member, i.e., the server 25, as in the case of a postage meter. Because of this, the printer may be replaced frequently without the expense or inconvenience of entire replacement. It will be appreciated that one printer may be used in place of the two printers 40, 44 shown and described, but the preferred embodiment contemplates the use of two printers for the reasons given.

Figure 2:
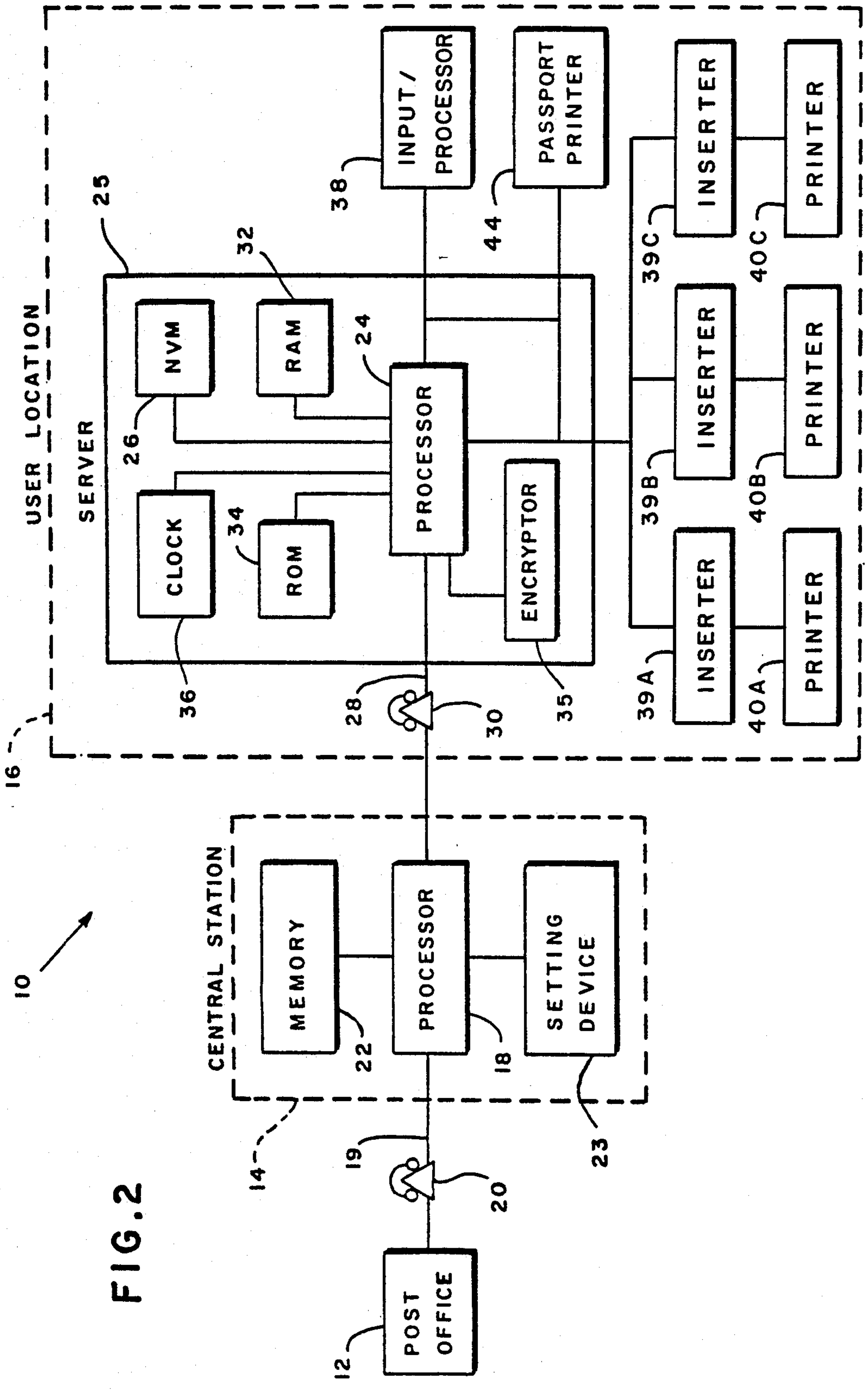
FIG. 2 is a block diagram of a batch mailing system with a plurality of work stations.
Figure 3:
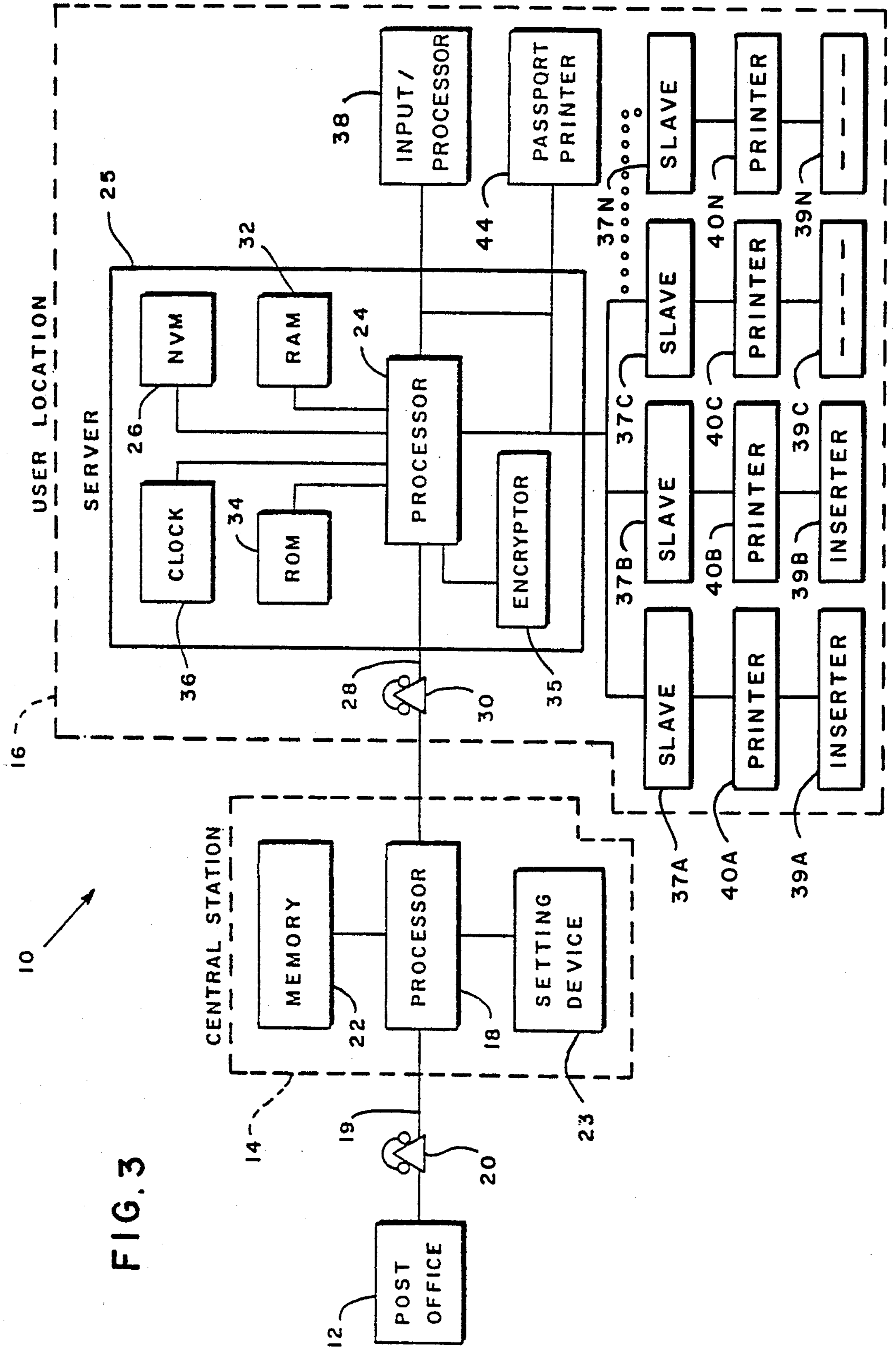
FIG. 3 is a block diagram of an alternative batch mailing system with a plurality of work stations.
Figures 4, 5:
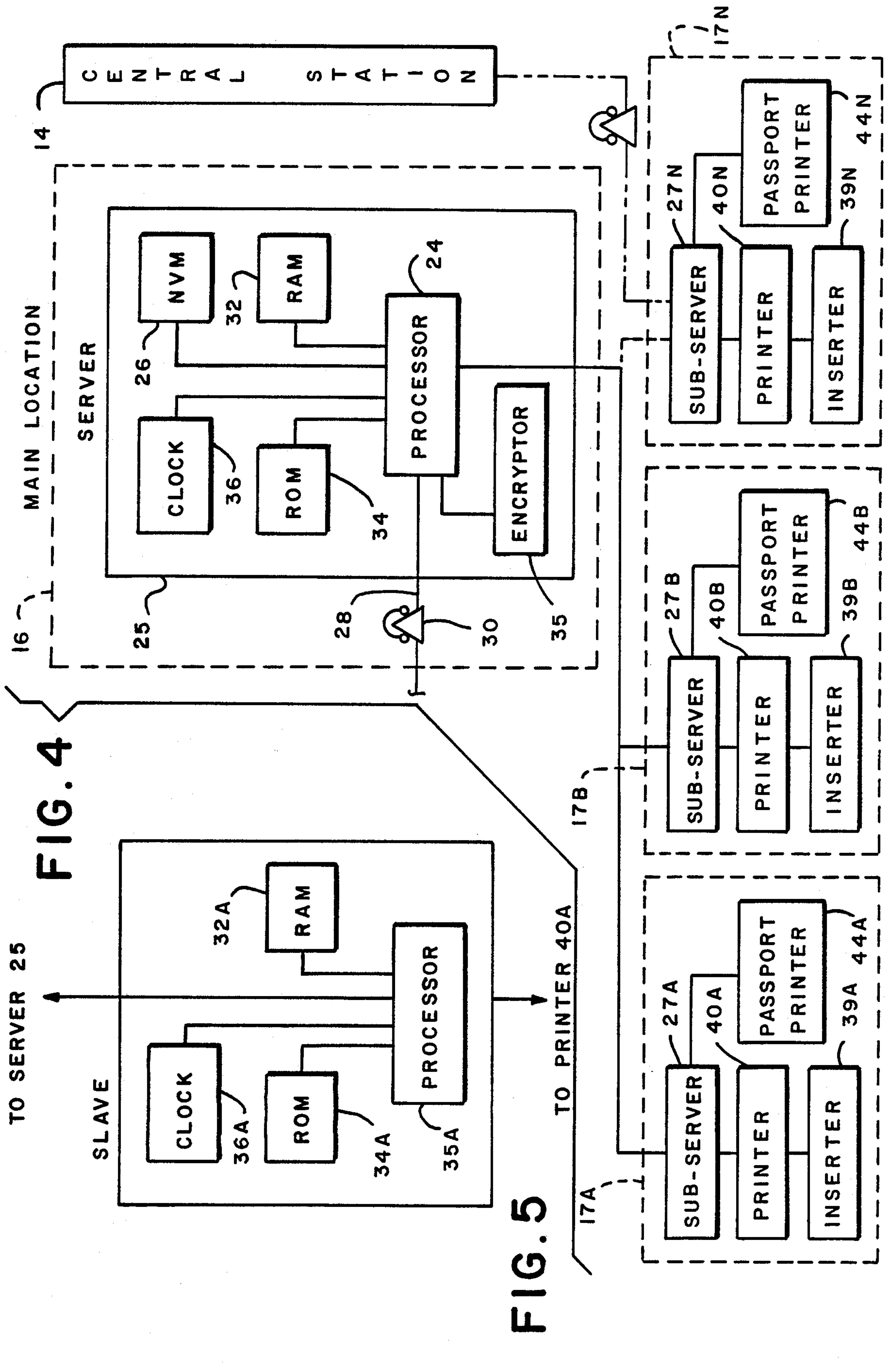
FIG. 4 is a block diagram of a batch mailing system with a plurality of independent work stations.
FIG. 5 is a block diagram of a slave unit shown in FIG. 3.

The mailing system shown in FIG. 1 includes a server 25 in connection with a single work station including an inserter 39 and mail piece printer 40. Reference will now be made to FIGS. 2, 3 and 5, wherein the server 25 is used with a plurality of work stations, each work station having an inserter 39 and a mail piece printer 40. Referring initially to FIG. 2, it will be seen that the server 25 is connected to an input/processor 38 for the input of information to the processor 24 of the server. The server 25 is also connected to a passport printer 44 for printing a statement containing information relative to mail that has been processed. In this embodiment, the processor 24 of the server 25 is in connection with a plurality of inserters 39A, 39B and 39C. Each inserter, 39A, 39B and 39C has associated therewith a printer 40A, 40B and 40C, respectively, for the purpose of printing postage information upon the face of a mail piece, or alternatively, to print facing inserts with appropriate mailing information. In this particular embodiment, a maximum of three inserters will be connected to the server 25. Such connection would be in the nature of multi-tasking or multiplexing. As is described in the flow chart of FIG. 11, the mailing information would be input through the input/processor 38 to the processor 24 in the form of tasks such that particular mail batches may be processed by particular ones of each of the inserters 39A–39C. The processor 24 will receive the tasking information and would distribute the various tasks among the inserters 39A–39C for the processing of batches of mail. The tasking information would be directed to the processing unit of the inserter 39 preceded by a header that would identify the particular inserter for which the mailing information is intended.

Where three or more inserters are to be used a problem may arise regarding sufficient processing power of the processor 24. In such a situation, a slave unit 37 would be utilized for the purpose of providing postage information to each of the inserters. As shown in FIG. 3, a plurality of slave units 37A, 37B, 37C . . . 37N would be connected to the processor 24. The slave unit 37 is a unit that does not have any security associated therewith, i.e., it does not have a secure housing of the type that is used by a postage meter or server 25. With reference to the flow chart of FIG. 12, the processor 24 would supply to each of the slave units 37A–37N sufficient postage information for the purpose of immediate processing a given batch of mail. Again, this would be accomplished by a header that precedes the postage information output by the processor 24, which header is to identify the particular slave unit 37 for which the particular postage information is intended. This postage information would be in the form of an authorization number for a batch of mail and the batch number. With reference to FIG. 5, each slave unit 37 would duplicate the components of a server 25 with the exception that it would not be contained within a secure housing and would have no non-volatile memory or encryptor. Furthermore, a slave unit 37 would be in contact with a server 25 and not with a central station 14 as in the case of the server. In this way the task to be performed would be directed to the dynamic memory of a slave unit 37, exemplified by the RAM 32A. After such postage information is transmitted to the RAM 32A of a slave unit 37A, it would be stored in the NVM 26 of the server 25 and subsequently printed as part of the information on a passport 46 upon being informed by a slave unit that a task has been completed. Each slave unit 37 would control a printer 40A–40N, respectively, which would be in connection with an inserter 39A–39N to print the postage on the envelopes 42. Upon completion of a batch of mail by a work station, appropriate data is transmitted from the slave unit 37 of the work station to the server 25 for the purpose of accounting for the mail processed by that work station. In this way, each work station, made up of a slave unit 37A, a printer 39A and an inserter 40A, would act independently and could be located anywhere within the network of the users location 16. As a consequence, the processing capacity of the server 25 would not be exceeded and there is only one accounting unit at the user location 16 that would print a passport 46 for batches of mail processed by all work stations. Thus, convenience, economy and security are achieved.

What has been shown thus far are embodiments where all mailing is processed from a single user location 16. With reference to FIG. 4, a preferred embodiment is shown where mail pieces are processed at different locations of a single user. In this case, each location 17A, 17B . . . 17N would have a subserver 27A, 27B . . . 27N. Each subserver would duplicate the structure of the server 25 with the exception that the subserver 27 communicates with the server 25 instead of the central station 14. Each subserver 27A, 27B . . . 27N would receive postage value from the server 25 which would be stored in its respective NVM 26. Thereafter, each sub-location 17A, 17B . . . 17N would operate independently as described previously in connection with FIG. 1.

Although only one user location 17 is shown in connection with a central station 14, it will be appreciated many user locations 16 with or without associated substations 17 will be serviced by the one central station 14. The central station 14 may be the location of a postage meter manufacturer or other accountable organization.

Also shown in FIG. 4 is a selective connection between the subserver 27N and the central station 14. Thus, as an optional feature or a backup, if required, a subserver such as 27N may be in communication directly with the central station 14 in order to credit the meter.

Figure 8:
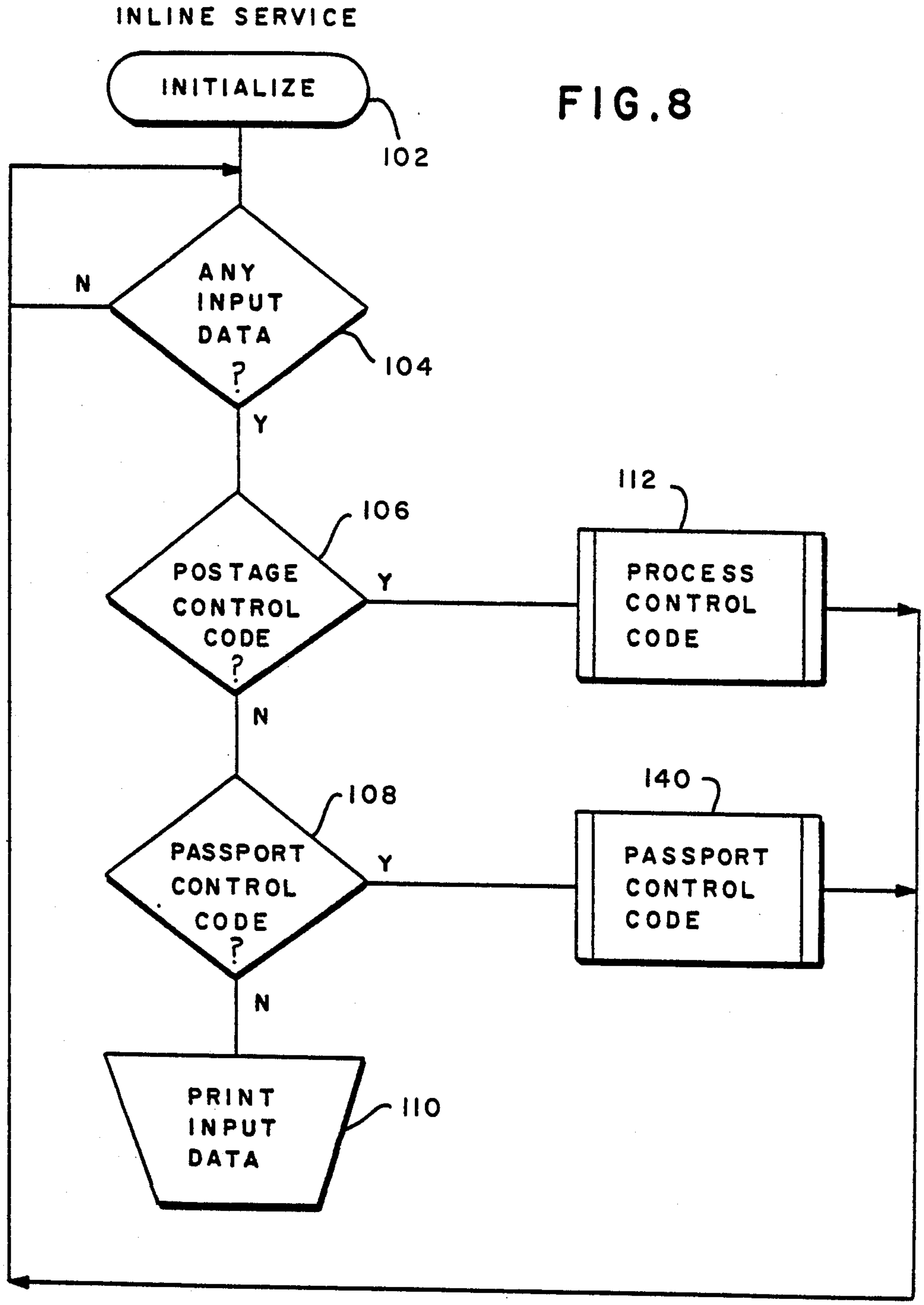
FIGS. 8–10 are flow charts that describe the functions of the system shown in FIG. 1.
Figure 9:
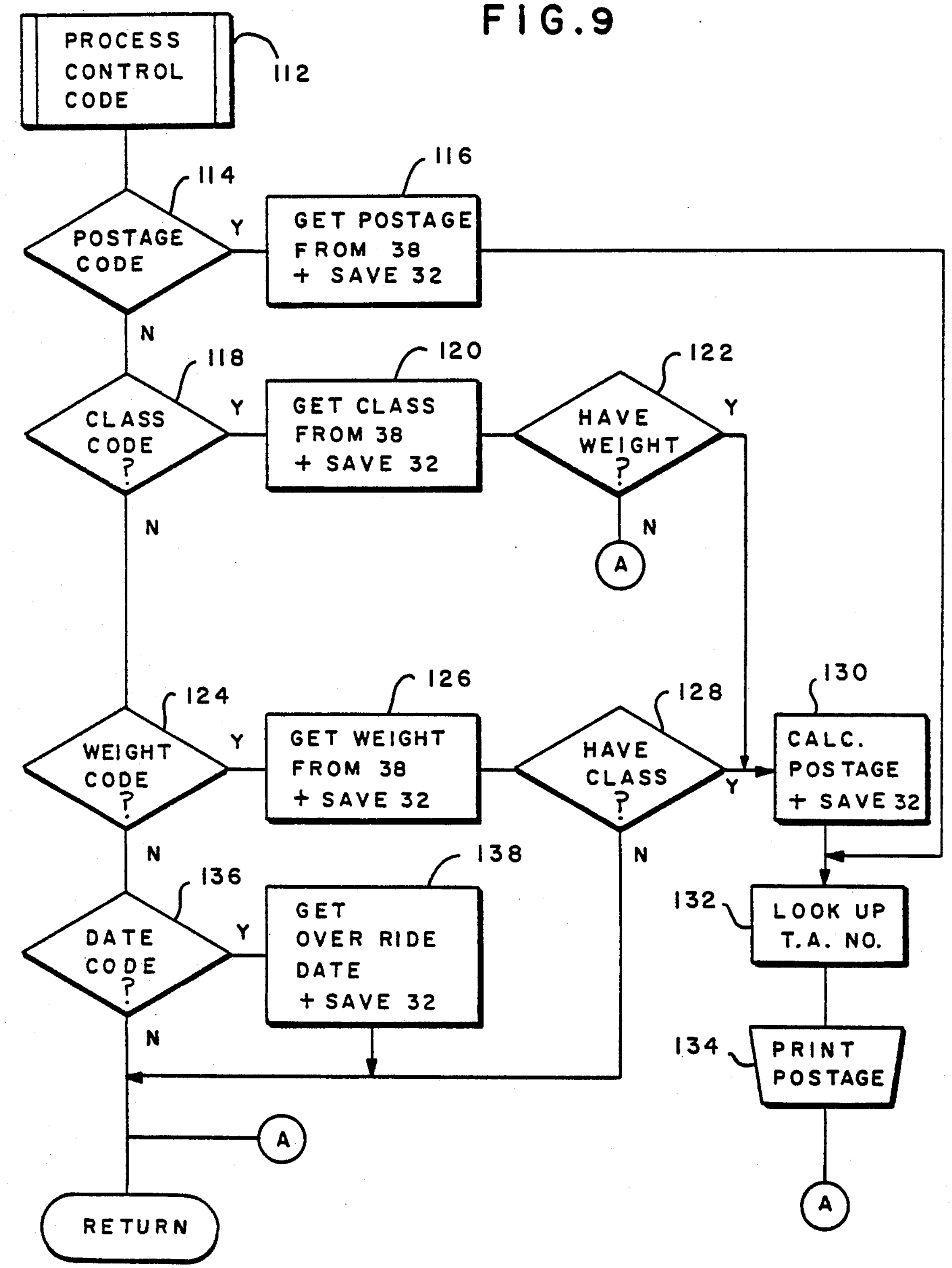
Figure 10:
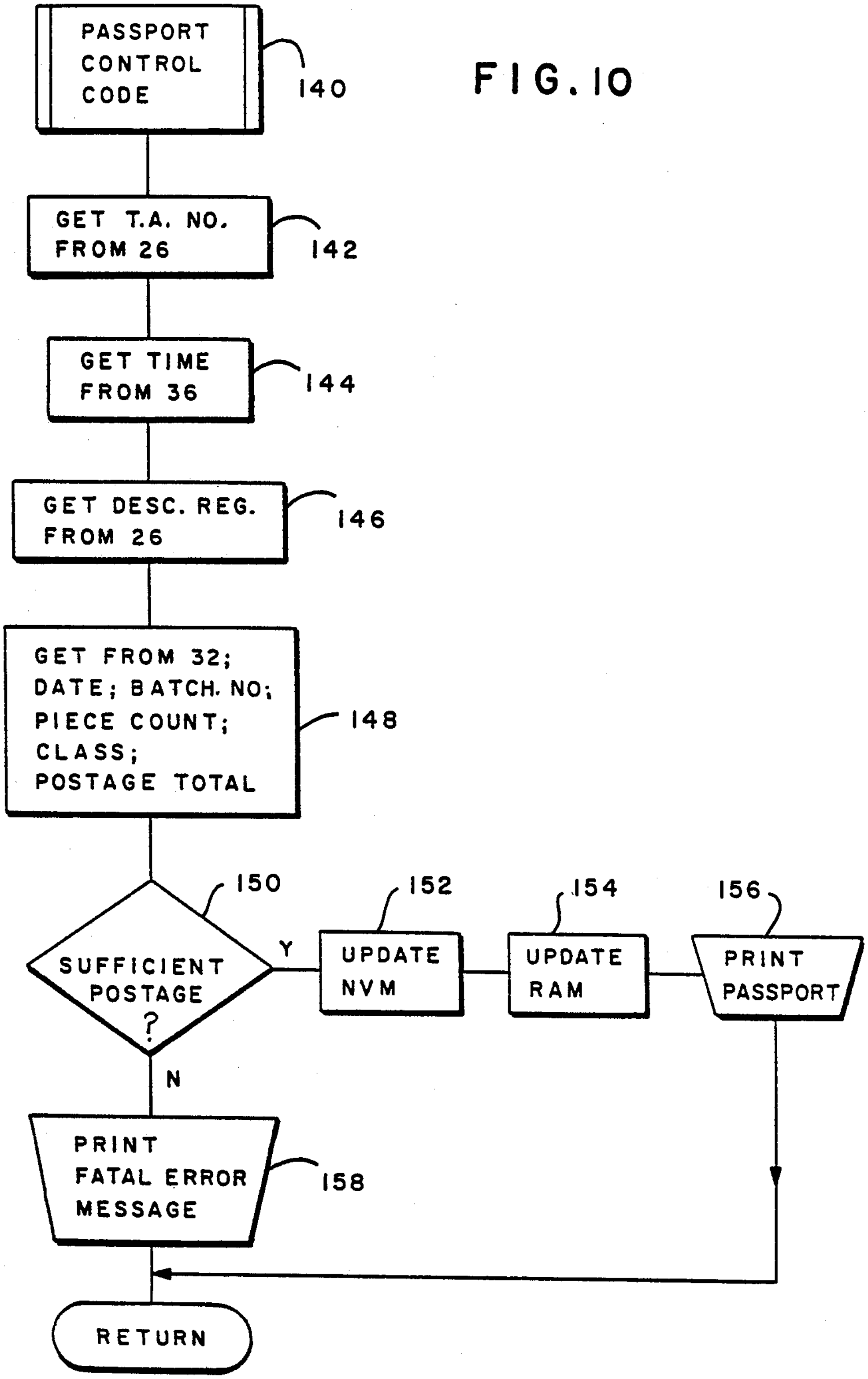

With reference to the flow charts, FIGS. 8–12C, a description of the operating procedures of the systems shown in FIGS. 1–3 will be described. Referring initially to FIGS. 8–10, the functions of the systme in FIG. 1 will be described. FIG. 8 describes the processing of data that is uploaded into the system. The system is first initialized 102 and the question is asked whether any input data is being received 104. If the answer is "no" then a closed loop is formed and the question is repeated, but if the answer is "yes", the next question asked is whether the code being received is a postage control code 106. If the response is affirmative, the postage control code is processed as is described in FIG. 9. If the response is negative, the question then asked is if the data is passport control code 108. If the answer is affirmative then the process described in FIG. 10 is then conducted. If the response is no then the input data is printed 110.

Referring now to FIG. 9, the processing of the process control code 112 will now be described. The question is first asked whether the code is a postage code 114. If the response is positive, the postage from the input/processor 38 is obtained and the information in the RAM 32 is saved 116. This postage is then forwarded as will be described hereinafter. If the response of the inquiry is negative, the question is then asked whether the code is a class code 118. If the response is affirmative, the postage class is obtained from the input processor 38 and the data is saved by storing in the RAM 32 and the class is forwarded 120. Thereafter, the question is asked whether the weight of the mail is available 122. If the response is "yes", the information is processed as will be described hereinafter. If the inquiry relative to the class code 118 is negative, then the question is asked whether the incoming control code is a weight code 124. If the response is "yes", then the weight is obtained from the input/processor 38 and the data in the RAM 32 is saved 126. Thereafter, this information is forwarded and the question is asked whether the class of the mail has been determined 128. If the response is "yes", the class of the mail plus the weight of the mail from 122 and postage code from 116 is combined and the postage is calculated with the data in RAM 32 being saved 130. Once the postage is calculated, the transaction number is obtained 132 and the postage is then printed on the mail piece 134. If the inquiry relative to the weight code 124 is negative, the question is then asked whether data code information is being received 136. If the response is "yes", the over ride date is obtained 138 plus the information from RAM 132 is saved, and the information is added on the class information. If the response is "no", then the process control code is returned.

With reference to FIG. 10, the program for processing the passport control code will now be described. Upon the passport control code being generated 140, the transaction number is obtained from the non-volatile memory 142, the time is obtained from the clock 144, and the postage value is obtained from the descending register 146. Upon this data being generated, the date, batch number, piece count, class and postage total are obtained from the RAM (32) 148, and the question is asked whether there sufficient postage 150. If there is sufficient postage, the non-volatile memory is updated 152, the RAM 32 is updated 154 and the passport is printed 156. With the latter step, the process is complete and the program is ready to start the cycle once more. If there is not sufficient postage, a fatal error message is generated 158 to alert the operator that there is insufficient postage for the amount of mail to be processed. Following this, the program will then recycle to the beginning.

Figure 11B:
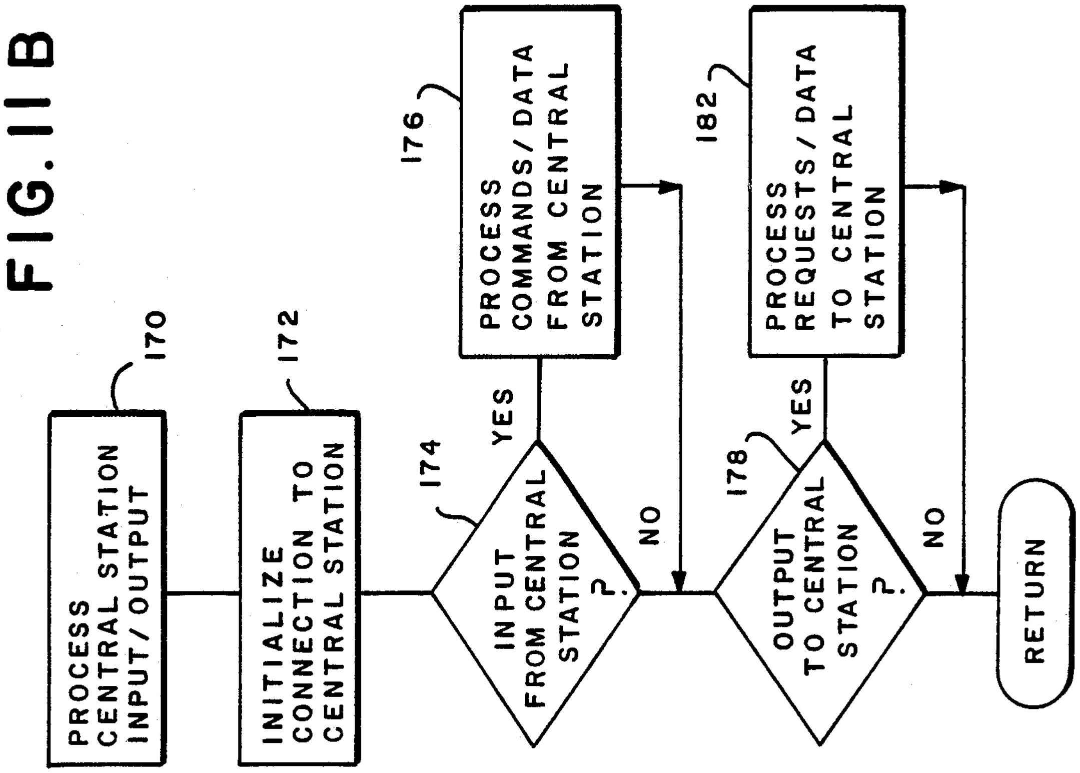
FIGS. 11A, 11B, 11C, 11D and 12A, 12B, and 12C are flow charts that describe the functions of the systems shown in FIGS. 2 and 3, respectively.
Figure 11A:
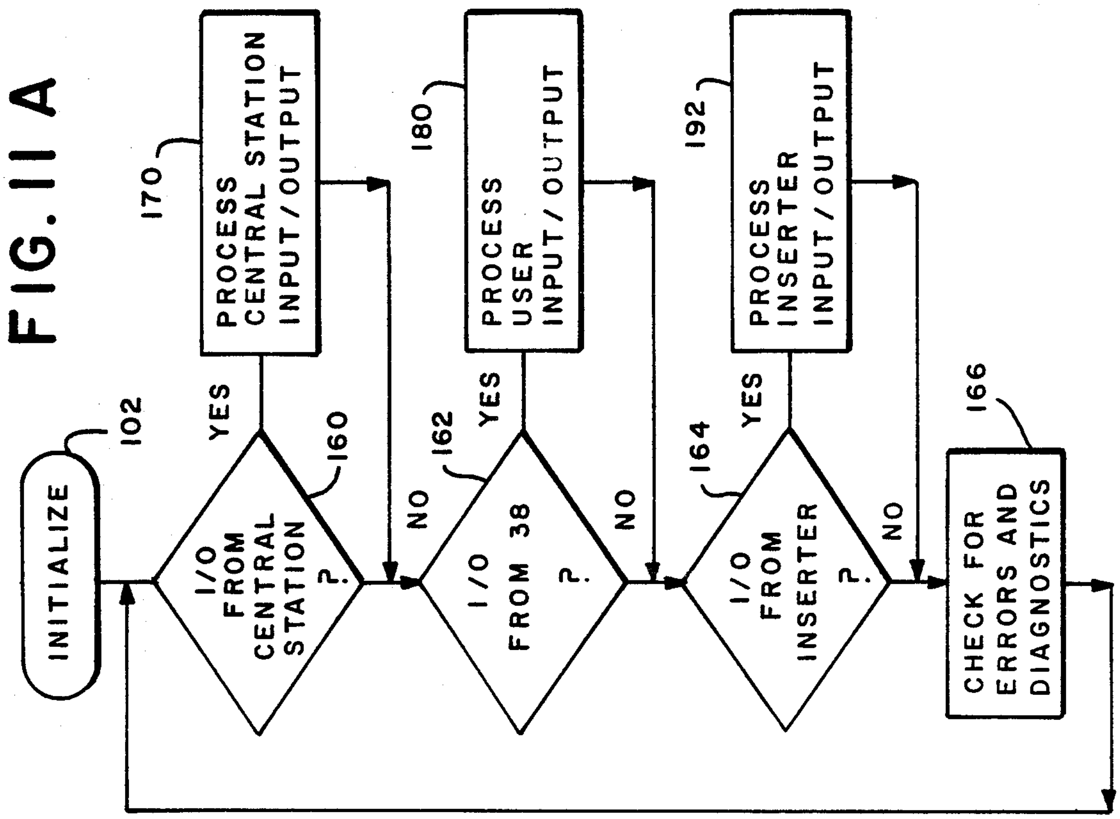

With reference to FIGS. 11A–11B, the manner in which a processor 24 processes the tasking information will now be described. With reference to FIG. 11A, after the system is initialized 102, the processor 24 inquires whether there is an input from the central station 160. If there is an input, this information will be processed as will be described in FIG. 11B. If the inquiry is "no", then the question is asked if there an input from the input/processor 162. If the inquiry is yes, then the information is processed by the process user as will be described with reference to FIG. 11C. If the answer is no, then an inquiry made as to whether there is information from the inserter 164. If the response to this is affirmative, then the information will be processed as will be described in FIG. 11D. If the response is no, then there is a check for errors and diagnostics 166 and a return to the start of the process. With reference to FIG. 11B, the input is received by the processor 24 that information is being received from the central station 170 and connection to the central station is initialized 172. An inquiry is made whether there is input from the central station 174, and if the rsponse is "yes", the commands and data from the central station are processed 176 and returned to the process following the inquiry regarding input from the central station 174. If the response is "no", an inquiry is made whether there is output to the central station 178. If an output is determined, then the requests and data to the central station are porcessed 180. If the inquiry is "no", or upon completion of the request/data processing, there is a return to the start of the cycle following inquiry of data from the central station 160.

Figure 11D:
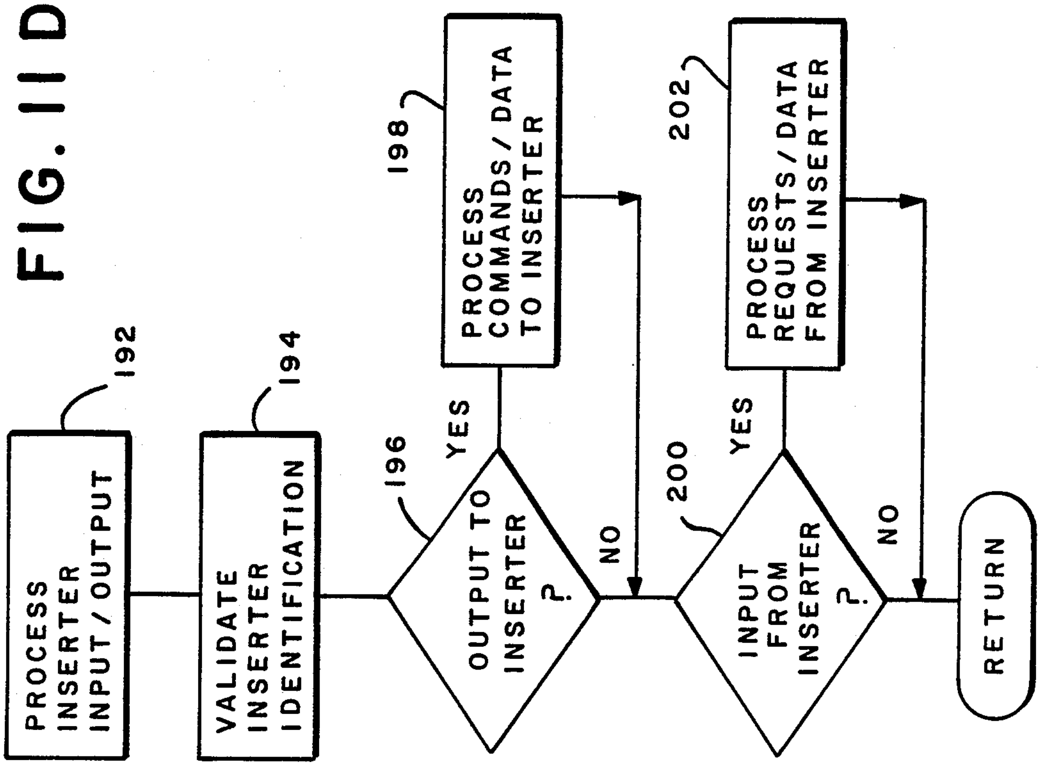
Figure 11C:
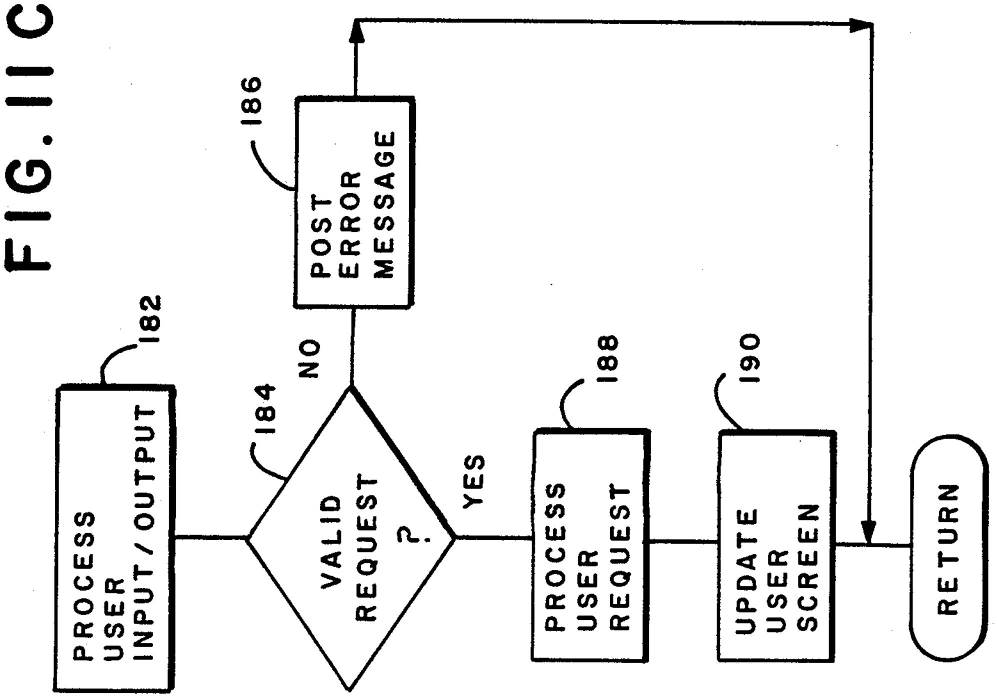

With reference to FIG. 11C, the process will be described whereby information is received by the user processor 182. An inquiry is made whether a valid request is being received 184, and if the response is "no", a post error message is sent 186 and there is a return to the main process cycle. If the response is "yes", then a user processor request is made 188 and the user processor screen is updated 190. Following this, the cycle is returned to the main processing following the inquiry of an input/output with regard to the RAM 162.

With reference to FIG. 11D, the process cycle is described when there is an input to or output from the inserter 192. The inserter identification is first validated 194 and an inquiry is made whether the data is an output to the inserter 196. If the response is "no" there is a return to the main process following the inserter inquiry 164. If the response is "yes", then the commands and data to the inserter are processed 198. If the response is "no", an inquiry is made whether it is an input from the inserter 200. If te response is yes, then the requests and data from the inserter are processed 202 and a return is made to the main process following the inquiry of data input/output with regard to the inserter.

Figure 12B:
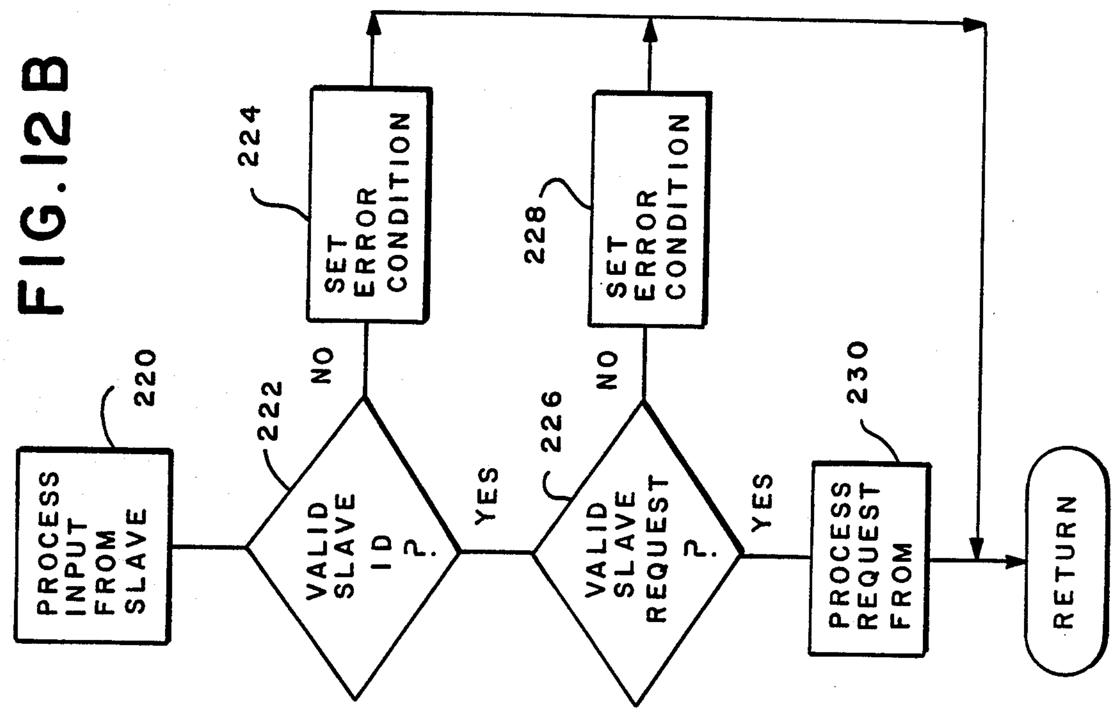
Figure 12A:
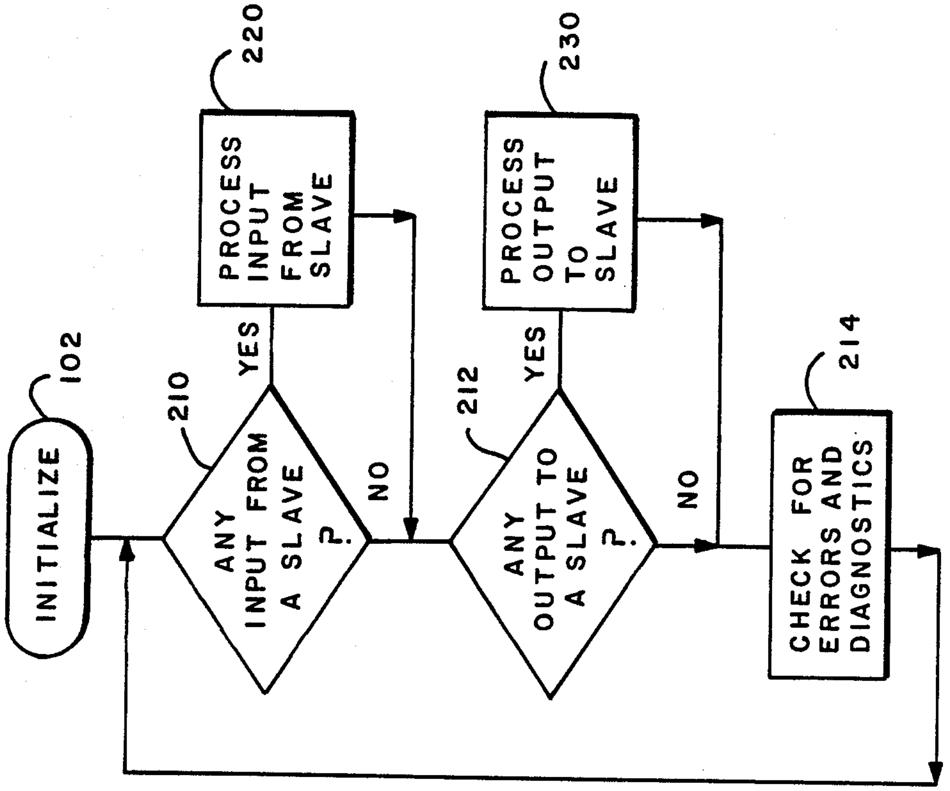
Figure 12C:
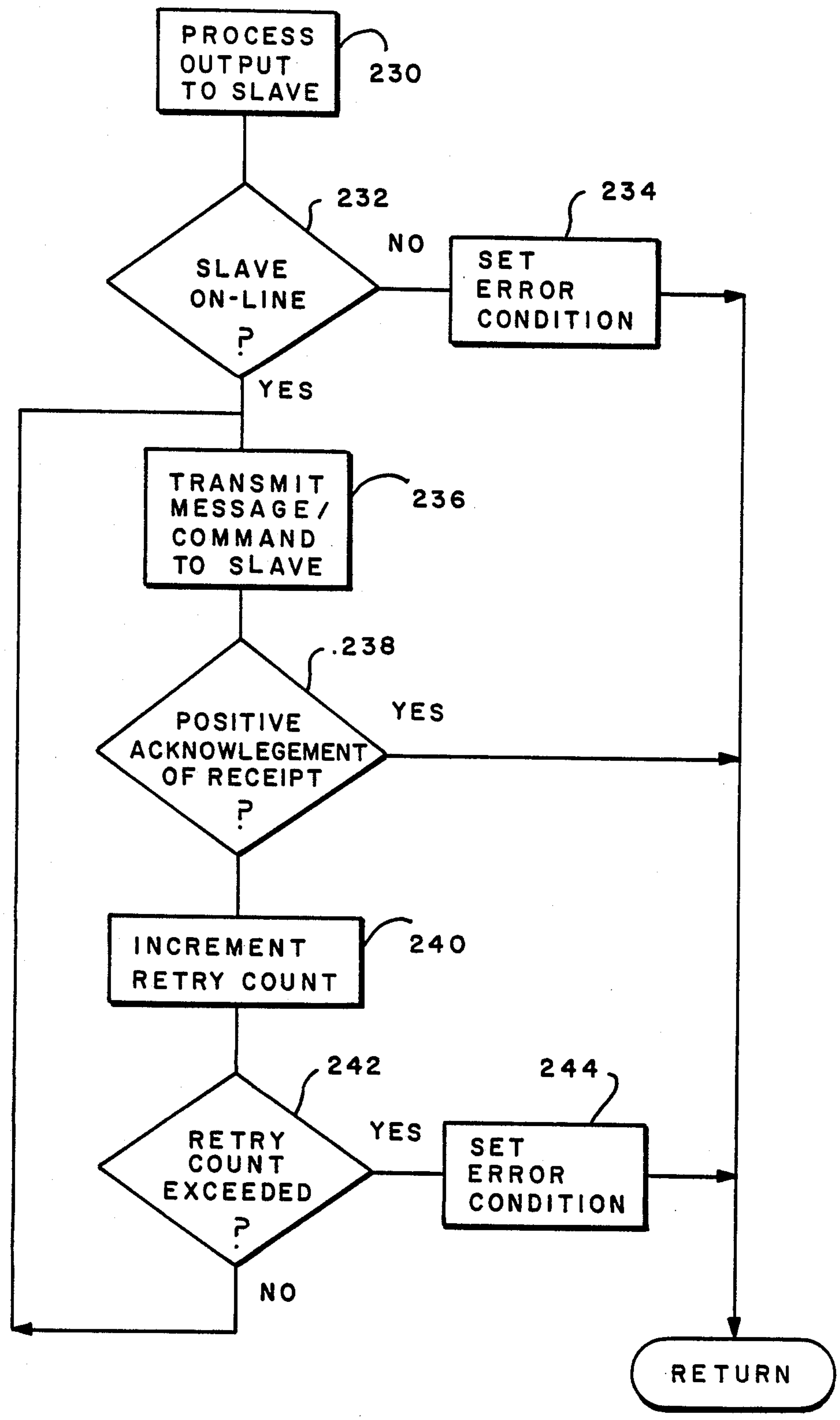

With reference to FIGS. 12A–12C, a description is given of the processes in which data is processed by the slave units 37. The system is initialized 102 and an inquiry made as to whether there is an input from a slave unit 210. If the response is "yes", the input is processed as will be described hereinafter. If the response is "no", then an inquiry is made as to whether there is an output to a slave unit 212. If the response is yes, then this is processed 230 as will be described with reference to FIG. 12C, but if the response is "no", there is a check for errors in diagnostics 214 and a return to the start of the process.

With reference to FIG. 12B, when an input is received from a slave unit 220, an inquiry is first made as to whether the identification of the slave unit is valid 222. If the reference is "no", then an error condition is set 224 and there is a return to the main process following the slage input, inquiry 210, but if the response is "yes", then an inquiry is made whether the request is valid 226. If the request is not valid, then an error condition is set 228, and there is a return but if the request is valid, the requested information is processed 229. Upon either an error condition being set 228 or the request being processed 229, there is a return to the main process following the slave input inquiry 210.

With reference to FIG. 12C, the process will be described wherein there is an output to a slave unit 230. An inquiry is first made whether the slave unit is on line 232. If the slave unit is not on line, an error condition is set 234 and there is a return to the main process following the slave output inquiry 212, but if the unit is on line, the message or command is downloaded to the slave unit 236. An inquiry is then made whether there is a positive acknowledgment of receipt 238. If there is a positive acknowledgment, then the system is returned, but if there is none, a retry increment is counted 240. A inquiry is then made as to whether the reentry count has been exceeded 242, if the response is "yes", an error condition is set 244 and there is a return to the main process following the slave output inquiry 212, but if the response is "no", then the cycle is returned to the status of a slave unit being on line.

What is claimed is:

1. A system for processing mail; said system comprises:

a secure accounting means including a processor and a memory, said memory providing storage for postage information;

means, in communication with said secure accounting means, for generating said postage information;

means for transmitting said postage information to an unsecured accounting means; and means, in communication with said unsecured accounting means, for printing at least a portion of said postage information on mail pieces.

2. The system of claim 1 further comprises:

means for changing said postage information in response to said postage information printed on said mail pieces.

3. A system for processing mail, said system comprising:

a secure accounting means including: a first processor, means for inputting postage information to said processor, a non-volatile memory in communication with said process, and means for storing postage value in said non-volatile memory;

at least one unsecure accounting means including: a second processor in communication with said first processor, and a memory in communication with said second processor; and at least one mail processing means including: a postage printing means in communication with said second processor, means for supplying mail pieces to said postage printing means, and means for actuating said printer to print postage information on said mail pieces.

4. The system of claim 3 further including a statement printer, connected to said secured accounting unit, for printing a statement sheet showing the amount of postage printed by said postage printing means.

5. The system of claim 4 wherein a fetchable identification number is stored in said non-volatile memory.

6. A system for processing mail, said system comprising:

a first secure accounting means including: a first porcessor, means for inputting postage information to said processor, a first non-volatile memory in communication with said processor, and means for storing postage value in said first non-volatile memory;

a plurality of second accounting means in communication with said first secure accounting means each of second accounting means including: a second processor, a second non-volatile memory in communication with said second processor, and communIcation means between said second processor and said first processor whereby postage value can be transferred between said first and second memories; and a plurality of mail processing means each including: unsecured postage printing means in communication with one of said second processors, means for supplying mail pieces to said unsecured postage printing means, and means for actuating said unsecured postage printing means to print postage on said mail pieces, such that the postage printed on said mail pieces is communicated to said second processor that reduces the postage value stored in said second non-volatile memory.

7. The system of claim 6 including means, connected to said second accounting unit, for printing a statement sheet showing the amount of postage printed by said postage printing means.

8. The system of claim 6 further comprising an electronic postage meter connected to said first secure accounting means.

9. The system of claim 8 further comprising telephone communication means for communication between said electronic postage meter and a central station.

10. A system for transmitting postage value comprising:

a central station having a first processor and a first memory in communication with said first processor, said first memory having means for storing postage value therein;

a user location having a secure accounting means including a second processor and a second memory in communication with said second processor, said second memory having descending register means for receiving and storing postage value and dispensing postage value upon command;

a communication link between said central station and said user location, said user location having a plurality of means for applying postage to mail pieces;

means for reducing the postage value stored in said descending register means in response to operation of said postage applying means; and means for transferring, through said communication link, information relative to the postage value applied by said postage applying means.

11. The system of claim 10 wherein said plurality of means for applying postage to mail pieces includes a plurality of inserters in communication with said second processor; and a plurality of printers, at least one printer associated with an inserter.

12. The system of claim 10 further including: a plurality of unsecure accounting means connected to said second processor, and connected to at least one of said inserters.

13. The system of claim 10 further including: a plurality of second secure accounting means connected to said second processor and to said inserters, each of said second secure accounting means having means for storing postage value.

14. The system of claim 10 wherein said second memory has a fetchable identification number stored therein.

15. A method of accounting for postage, said method comprising the steps of:

storage postage value in a secure accounting means;

generating postage information;

printing said postage information upon a statement sheet;

transmitting said postage information to a remote unsecure accounting means; and printing postage on mail pieces in accordance with said postage information in said unsecure accounting means and adjusting the stored postage value in response to the printed postage.

16. A method for transmitting postage value, said method comprising the steps of:

inputting postage value to a first memory in a secure accounting means;

transferring at least a portion of the postage value to a second memory of an unsecured accounting means;

applying postage to mail; and reducing the postage value stored in said second memory.

17. The method of claim 16 further including the step of:

transferring the portion of the postage value in said second memory remaining after the applying of postage to mail to said first memory.

18. A method for transmitting postage value, said method comprising the steps of:

storing postage value in a secured accounting means, generating postage data;

printing the postage data upon a statement;

transmitting at least a portion of said postage value to a remote secure accounting means;

printing postage on mail pieces; and reducing the postage value in the remote second accounting means in response to the printed postage.

19. A method of processing mail, said method comprising the steps of:

inputting mailing information into a secure accounting means that is in communication with a plurality of unsecure accounting means, the mailing information including tasks to be performed by each os said unsecure accounting means;

printing at least a portion of said mailing information on mail pieces in accordance with said tasks performed by said unsecure accounting means and determining the postage required by said tasks;

keeping a running record in each unsecured accounting means of the postage required to print the postage on said mail pieces; and transmitting the final postage accumulated by each unsecure accounting means to said secure accounting means upon completion of a mail batch.

20. A system for transmitting postage value comprising:

a user location having a secure accounting means including a processor and a memory in communication with said processor, said memory having a descending register therein for receiving and storing postage value and for dispensing postagle value upon command, said user location having means for applying postage to mail pieces; and a plurality of inserters in communication with said processor.

* * * * *